US012812654B2

(12) United States Patent
Zhao

(10) Patent No.: US 12,812,654 B2
(45) Date of Patent: Nov. 24, 2026

(54) INDICATION DETERMINATION AND INFORMATION SETTING

(71) Applicant: Beijing Xiaomi Mobile Software Co., Ltd., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 248 days.

(21) Appl. No.: 18/837,712

(22) PCT Filed: Feb. 14, 2022

(86) PCT No.: PCT/CN2022/076248
§ 371 (c)(1),
(2) Date: Aug. 12, 2024

(87) PCT Pub. No.: WO2023/151094
PCT Pub. Date: Aug. 17, 2023

(65) Prior Publication Data
US 2025/0168856 A1 May 22, 2025

(51) Int. Cl.
*H04W 72/23* (2023.01)
*H04L 5/00* (2006.01)

(52) U.S. Cl.
CPC ........... *H04W 72/23* (2023.01); *H04L 5/0053* (2013.01)

(58) Field of Classification Search
None
See application file for complete search history.

(56) References Cited

U.S. PATENT DOCUMENTS

| | | | | |
|---|---|---|---|---|
| 2010/0058135 | A1 | 3/2010 | Tseng | |
| 2020/0396760 | A1 | 12/2020 | Yi et al. | |
| 2022/0322293 | A1* | 10/2022 | Baek | H04L 1/1812 |
| 2022/0322313 | A1* | 10/2022 | Zhang | H04L 1/1864 |
| 2023/0413286 | A1* | 12/2023 | Wang | H04L 25/03866 |
| 2024/0340117 | A1* | 10/2024 | Lei | H04L 1/1864 |

FOREIGN PATENT DOCUMENTS

| | | | |
|---|---|---|---|
| CN | 102123399 | A | 7/2011 |
| CN | 110536443 | A | 12/2019 |
| CN | 110730513 | A | 1/2020 |
| CN | 111479333 | A | 7/2020 |
| CN | 113595689 | A | 11/2021 |
| WO | 2021062767 | A1 | 4/2021 |
| WO | 2021164036 | A1 | 8/2021 |

OTHER PUBLICATIONS

Moderator (CMCC), "Summary#1 on mechanisms to support group scheduling for RRC_Connected UEs for NR MBS", 3GPP TSG RAN WG1 # 106bis-e,R1-2109302, e-Meeting, Oct. 11-19, 2021.

* cited by examiner

*Primary Examiner* — The Hy Nguyen
(74) *Attorney, Agent, or Firm* — Volpe Koenig

(57) ABSTRACT

A method for determining an indication, comprises: obtaining a first new data indicator (NDI) in first downlink control information (DCI) transmitted by a network side device, wherein the first DCI is scrambled by a first radio network temporary identifier (RNTI); obtaining second DCI received most recently prior to the first DCI, wherein a second RNTI scrambling the second DCI is identical to the first RNTI; and determining information indicated by the first NDI according to a relation between a second NDI in the second DCI and the first NDI.

20 Claims, 7 Drawing Sheets

INDICATION DETERMINATION AND INFORMATION SETTING

CROSS-REFERENCE OF RELATED APPLICATION

The present application is a U.S. National Stage of International Application No. PCT/CN2022/076248, filed on Feb. 14, 2022, the contents of all of which are incorporated herein by reference in their entireties for all purposes.

BACKGROUND

In a process of communicating with a terminal, a network side can transmit downlink control information (DCI) to the terminal and schedule transmitted information through the DCI.

SUMMARY

The disclosure relates to the field of communication, and a method and an apparatus for determining an indication, a method and an apparatus for setting information, a communication apparatus, and a computer-readable storage medium are provided in examples of the disclosure.

In a first aspect, a method for determining an indication is provided according to an example of the disclosure, which is executed by a terminal and includes: obtaining a first new data indicator (NDI) in first downlink control information (DCI) transmitted by a network side device, where the first DCI is scrambled by a first radio network temporary identifier (RNTI); obtaining second DCI received most recently prior to the first DCI, where a second RNTI scrambling the second DCI is identical to the first RNTI; and determining information indicated by the first NDI according to a relation between a second NDI in the second DCI and the first NDI.

In a second aspect, a method for setting information is provided according to an example of the disclosure, which is executed by a network side device and includes: transmitting first downlink control information (DCI) to a terminal, where the first DCI is scrambled by a first radio network temporary identifier (RNTI); obtaining second DCI transmitted to the terminal most recently prior to the first DCI, where a second RNTI scrambling the second DCI is identical to the first RNTI; and setting a first NDI in the first DCI according to a second NDI in the second DCI.

In a third aspect, an apparatus for determining an indication is provided according to an example of the disclosure, which is applicable to a terminal and includes: a processing module, configured to obtain a first new data indicator (NDI) in first downlink control information (DCI) transmitted by a network side device, where the first DCI is scrambled by a first radio network temporary identifier (RNTI); obtain second DCI received most recently prior to the first DCI, where a second RNTI scrambling the second DCI is identical to the first RNTI; and determine information indicated by the first NDI according to a relation between a second NDI in the second DCI and the first NDI.

In a fourth aspect, an apparatus for setting information is provided according to an example of the disclosure, which is applicable to a network side device and includes: a transmission module, configured to transmit first downlink control information (DCI) to a terminal, where the first DCI is scrambled by a first radio network temporary identifier (RNTI); and a processing module, configured to obtain second DCI transmitted to the terminal most recently prior to the first DCI, where a second RNTI scrambling the second DCI is identical to the first RNTI; and set a first NDI in the first DCI according to a second NDI in the second DCI.

In a fifth aspect, a communication apparatus is provided according to an example of the disclosure, which includes: a processor; and a memory, configured to store a computer program; where the computer program implements the above method for determining an indication when executed by the processor.

In a sixth aspect, a communication apparatus is provided according to an example of the disclosure, which includes: a processor; and a memory, configured to store a computer program; where the computer program implements the above method for setting information when executed by the processor.

In a seventh aspect, a non-transitory computer-readable storage medium is provided according to an example of the disclosure, which is configured to store a computer program, where the computer program implements steps of the above method for determining an indication when executed by a processor.

In an eighth aspect, a non-transitory computer-readable storage medium is provided according to an example of the disclosure, which is configured to store a computer program, where the computer program implements steps of the above method for setting information when executed by a processor.

BRIEF DESCRIPTION OF DRAWINGS

In order to describe the solutions in examples of the disclosure more clearly, the accompanying drawings required for describing the examples are briefly described below. Evidently, the accompanying drawings in the following description are merely some examples of the disclosure. Other drawings can be derived from these accompanying drawings without creative efforts by those with ordinary skills in the art.

FIG. illustrates a schematic flowchart of yet another method for determining an indication according to an example of the disclosure.

Figure 6:
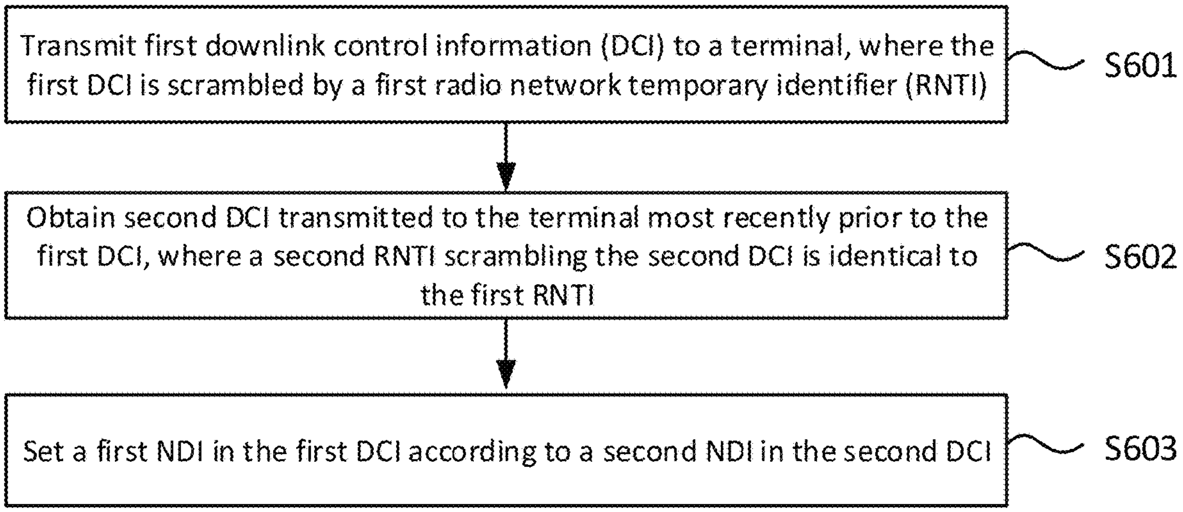

FIG. 6 illustrates a schematic flowchart of a method for setting information according to an example of the disclosure.

Figure 7:
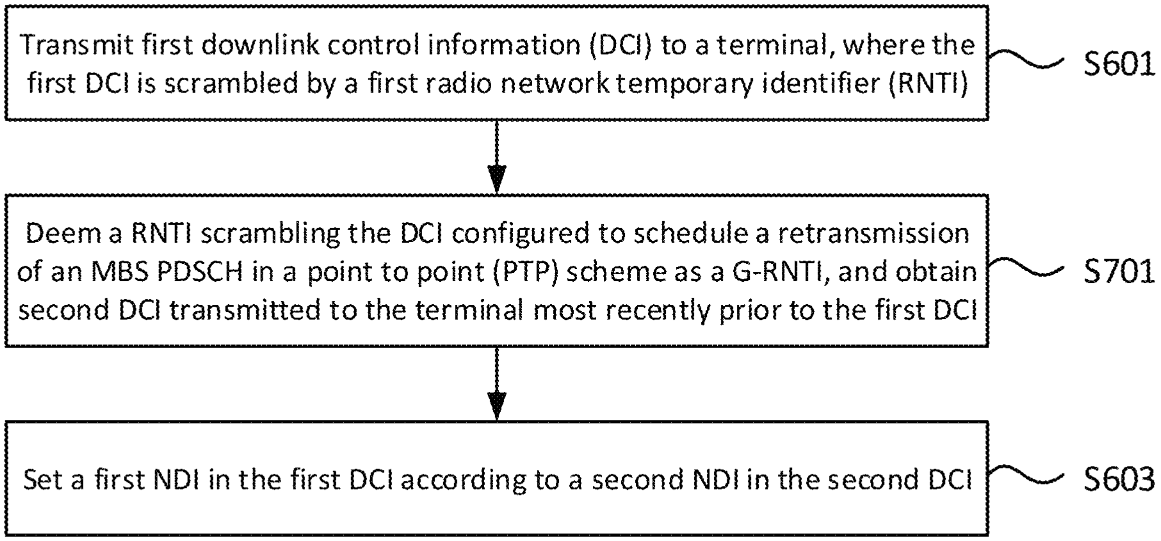

FIG. 7 illustrates a schematic flowchart of another method for setting information according to an example of the disclosure.

Figure 8:
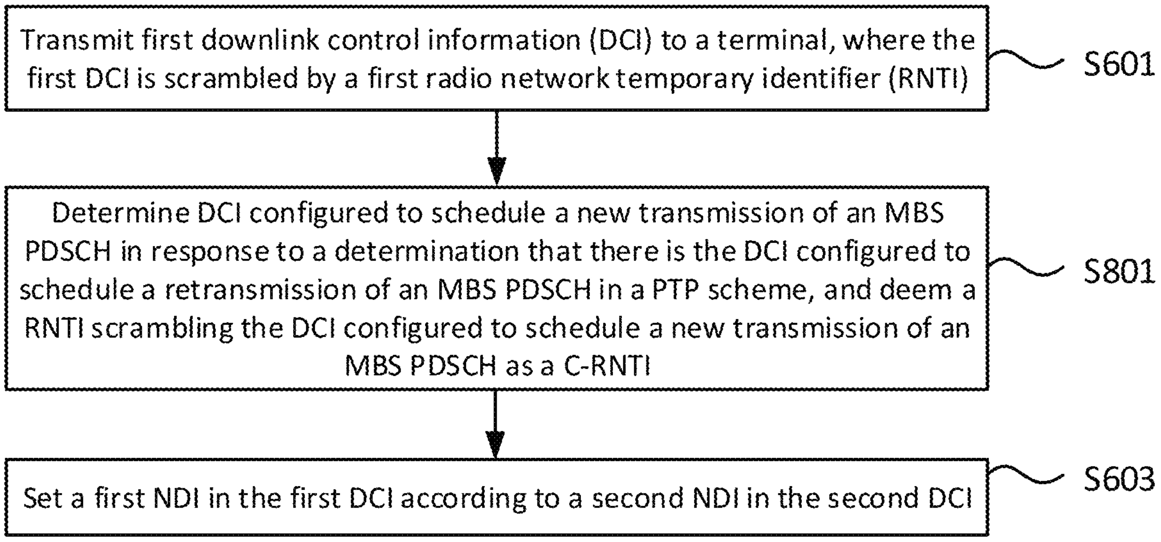

FIG. 8 illustrates a schematic flowchart of yet another method for setting information according to an example of the disclosure.

Figure 9:
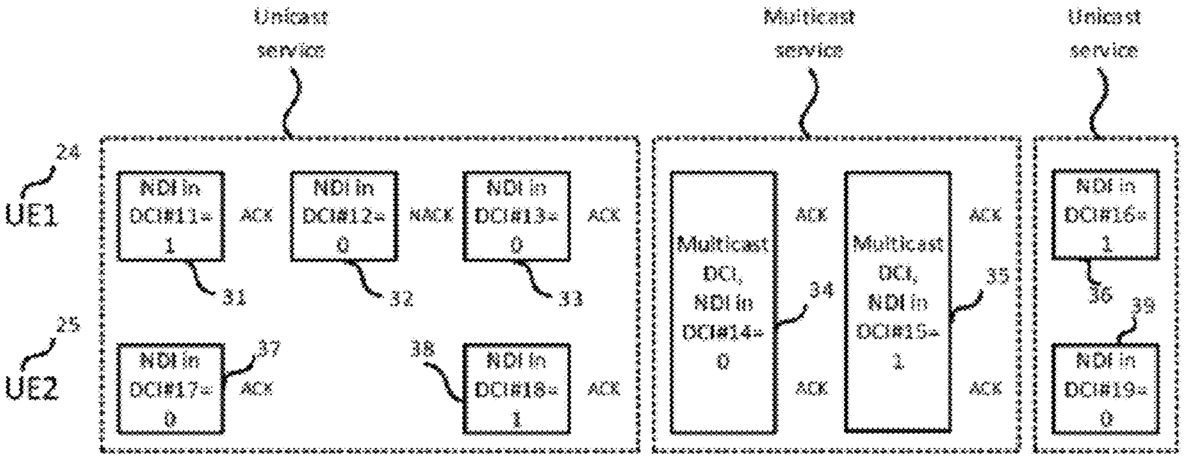

FIG. 9 illustrates a schematic diagram of determining a meaning of an NDI according to an example of the disclosure.

Figure 10:
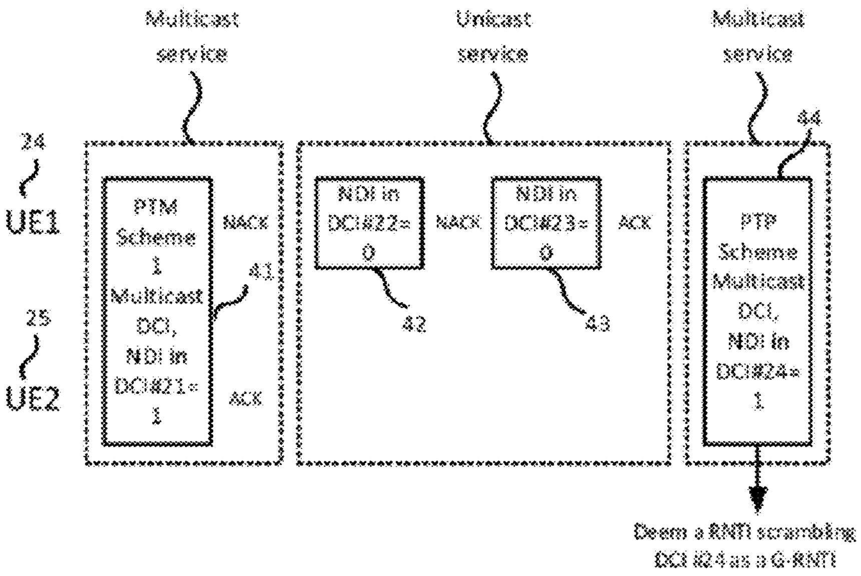

FIG. 10 illustrates another schematic diagram of determining a meaning of an NDI according to an example of the disclosure.

Figure 11:
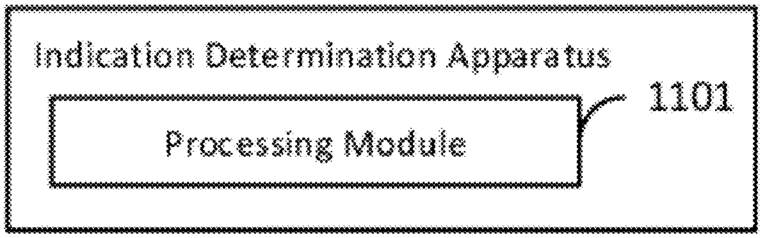

FIG. 11 illustrates a schematic block diagram of an apparatus for determining an indication according to an example of the disclosure.

Figure 12:
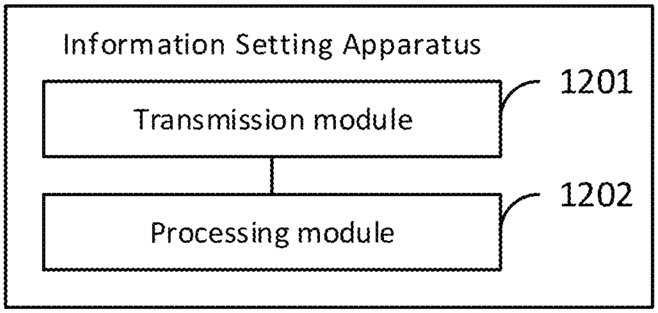

FIG. 12 illustrates a schematic block diagram of an apparatus for setting information according to an example of the disclosure.

Figure 13:
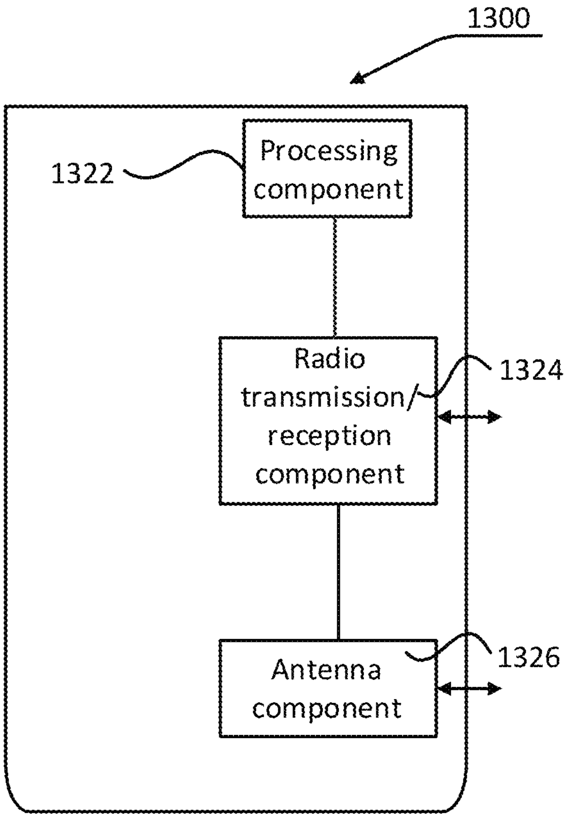

FIG. 13 illustrates a schematic block diagram of an apparatus for setting information according to an example of the disclosure.

Figure 14:
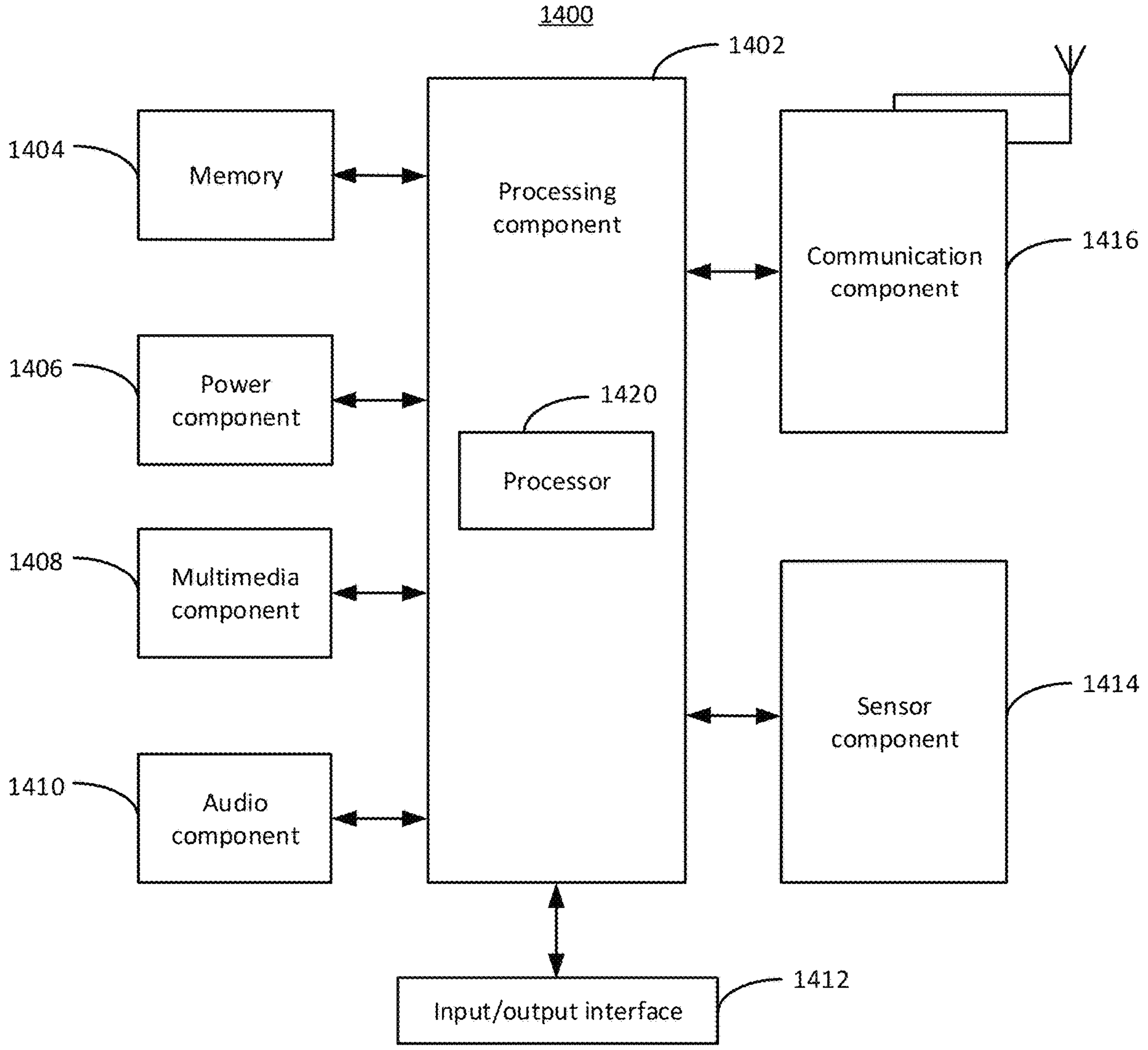

FIG. 14 illustrates a schematic block diagram of an apparatus for determining an indication according to an example of the disclosure.

DETAILED DESCRIPTION OF THE INVENTION

The solutions in examples of the disclosure are clearly and completely described below with reference to the accompanying drawings in the examples of the disclosure. Apparently, the examples described are merely some, rather than all examples of the disclosure. On the basis of the examples of the disclosure, all other examples that can be derived by those with ordinary skills in the art without creative efforts will fall within the scope of protection of the disclosure.

The terms used in the examples of the disclosure are merely used to describe specific examples, rather than limit the examples of the disclosure. The singular forms such as "a", "an", and "the" used in the examples of the disclosure and the appended claims are also intended to include the plural forms, unless clearly stated in the context otherwise. It should also be understood that the term "and/or" used here means and encompasses one or any or all possible combinations of a plurality of associated items listed.

It should be understood that while the terms first, second, third, etc. may be employed in the examples of the disclosure to describe various information, it should not be limited to these pieces of information. These terms are merely used to distinguish between the same type of information. For example, first information can also be referred to as second information, and similarly, second information can also be referred to as first information, without departing from the scope of the examples of the disclosure. The word "if" as used here can be interpreted as "at the time of", "when", or "in response to determining", depending on the context.

For concision and easy understanding, the terms "greater than" or "smaller than", and "higher than" or "lower than" are used here to denote a magnitude relation. However, those skilled in the art can understand that the term "greater than" also covers the meaning of "greater than or equal to", and the term "smaller than" also covers the meaning of "smaller than or equal to"; and the term "higher than" covers the meaning of "higher than or equal to", and the term "lower than" also covers the meaning of "lower than or equal to."

As described above, a network side can transmit downlink control information (DCI) to the terminal and schedule transmitted information through the DCI, which carries a new data indicator (NDI). The terminal can determine whether the information scheduled through the DCI is a new transmission or a retransmission according to a relation between a value of the NDI and a value of an NDI in the immediately previous DCI. However, in some cases, an error may occur when comparing the value of the NDI in the DCI with the value of the NDI in the previous DCI to determine whether the information scheduled is a new transmission or a retransmission.

Figure 1:
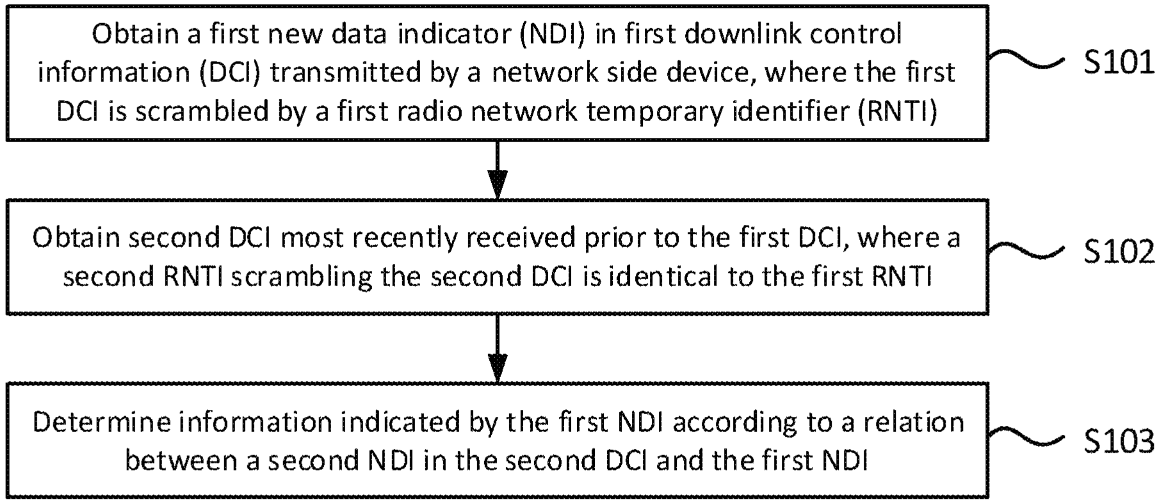
FIG. 1 illustrates a schematic flowchart of a method for determining an indication according to an example of the disclosure.

FIG. 1 illustrates a schematic flowchart of a method for determining an indication according to an example of the disclosure. The method for determining an indication shown in the example may be performed by a terminal. The terminal includes, but is not limited to, a mobile phone, a tablet computer, a wearable device, a sensor, an Internet of Things device (for example, a narrow band Internet of Things (NB-IoT) device), a machine type communication (MTC) apparatus, an enhanced machine type communication (eMTC) apparatus, etc. The terminal may communicate with a network side device. The network side device includes, but is not limited to, a 4th generation (4G) network side device, a 5th generation (5G) network side device, a 6th generation (6G) network side device, etc., and may be, for example, a base station and a core network.

As shown in FIG. 1, the method for determining an indication may include:

S101, a first new data indicator (NDI) in first downlink control information (DCI) transmitted by a network side device is obtained, where the first DCI is scrambled by a first radio network temporary identifier (RNTI);

S102, a second DCI received most recently prior to the first DCI is obtained, where a second RNTI scrambling the second DCI is identical to the first RNTI; and S103, information indicated by the first NDI is determined according to a relation between a second NDI in the second DCI and the first NDI.

In an example, a communication scheme supported by the terminal includes, but is not limited to, a point to multiple (PTM) scheme and a point to point (PTP) scheme.

When communication is in a PTM scheme, for example, a PTM scheme 1 is employed for communication, multicast (including broadcast and multicast) DCI transmitted by the network side may be received and configured to schedule a transmission of multicast information. For example, a multicast service physical downlink shared channel (MBS PDSCH) may be scheduled.

The DCI configured to schedule the MBS PDSCH and received in the PTM scheme 1 may be scrambled by a group radio network temporary identifier (G-RNTI). It should be noted that the DCI scrambling in all the examples of the disclosure may refer to the scrambling of a cyclical redundancy check (CRC) sequence of the DCI.

When communication is in a PTP scheme, the terminal may transmit unicast DCI configured to schedule the MBS PDSCH to the terminal. The DCI may be scrambled by a cell radio network temporary identifier (C-RNTI), and the MBS PDSCH scheduled may be scrambled by the G-RNTI. When communication is in the PTP scheme, the terminal may also transmit unicast DCI configured to schedule a retransmission of the MBS PDSCH to the terminal. The DCI configured to schedule a retransmission is scrambled by the C-RNTI.

In addition, the terminal may also support unicast service scheduling via unicast DCI.

Figure 2:
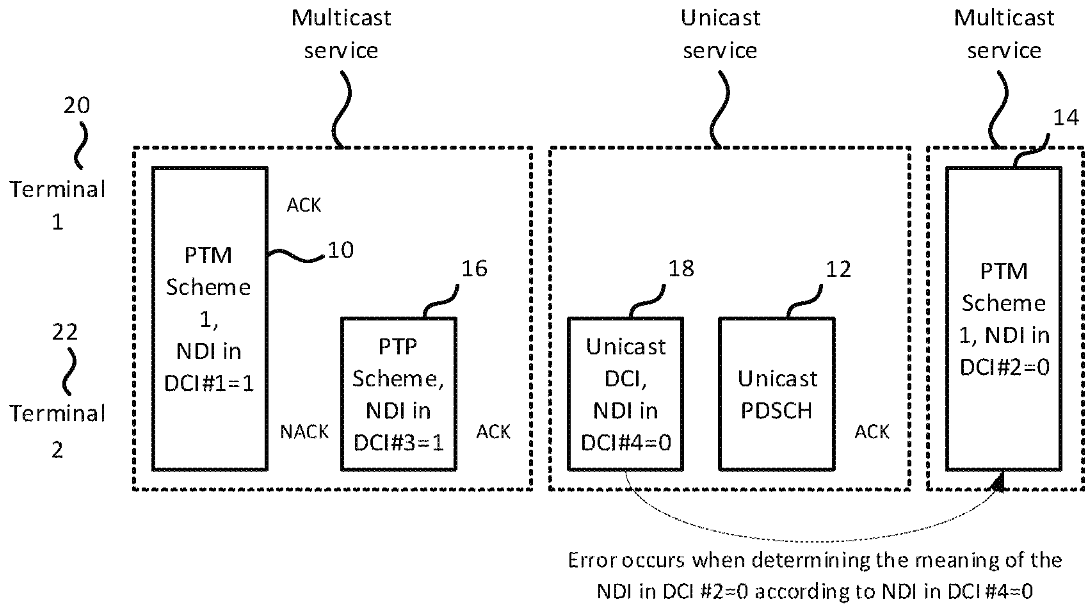
FIG. 2 is a schematic diagram of determining a meaning of a new data indicator (NDI) in the related art.

FIG. 2 is a schematic diagram of determining the meaning of an NDI in the related art.

As shown in FIG. 2, for terminal 1 20, in a multicast service phase, the network side communicates with terminal 1 in the PTM scheme 1 first. The network side device transmits multicast DCI #1 10 configured to schedule a new transmission of the MBS PDSCH to the terminal, and a value of an NDI in DCI #1 is 1.

After a successful receipt (for example, received and successfully decoded), terminal 1 transmits a hybrid automatic repeat request acknowledgment (HARQ-ACK) to the network side.

After receiving the HARQ-ACK, the network side may determine that terminal 1 receives the new transmission of the MBS PDSCH 12 successfully, and then may transmit multicast DCI #2 14 configured to schedule a new transmission of another MBS PDSCH to the terminal in the PTM scheme 1 in the multicast service phase, and the value of the NDI in DCI #2 is 0.

After receiving DCI #2, terminal 1 may determine that the immediately previous DCI of DCI #2 is DCI #1, and then determine that DCI #1 is different from DCI #2 by comparing the NDI in DCI #1 with the NDI in DCI #2, so as to determine that the information indicated by the NDI in DCI #2 indicates a new transmission (indicating that data scheduled by the DCI where the NDI is located are newly transmitted).

For terminal 2 22, in the multicast service phase, the network side communicates with terminal 2 in the PTM scheme 1 first. The network side device transmits multicast DCI #1 configured to schedule a new transmission of the MBS PDSCH to the terminal (for example, terminal 1 and terminal 2 belong to the same group (such as an MBS group), and thus may receive the same multicast DCI). The value of the NDI in DCI #1 is 1.

If it fails, terminal 2 transmits a hybrid automatic repeat request negative acknowledgment (HARQ-NACK) to the network side.

After receiving the HARQ-NACK, the network side may determine that terminal 2 fails to receive the new transmission of the MBS PDSCH, and then may communicate in the PTP scheme, for example, transmit DCI #3 configured to schedule a retransmission (rather than a repetition of the transmission) of the MBS PDSCH to the terminal in the PTP scheme. The value of the NDI in DCI #3 is still 1, indicating the retransmission (indicating data scheduled by the DCI where the NDI is located are retransmitted).

After a successful receipt, terminal 2 transmits a HARQ-ACK to the network side.

Next, the network side performs a unicast service with terminal 2 and transmits DCI #4 configured to schedule a new transmission of the unicast PDSCH to terminal 2. The value of the NDI in DCI #4 is 0.

After a successful receipt, terminal 2 transmits a HARQ-ACK to the network side.

Next, the network side performs multicast service communication with terminal 2 in the PTM scheme 1, and transmits multicast DCI #2 configured to schedule a new transmission of another MBS PDSCH to the terminal. The value of the NDI in DCI #2 is 0.

After receiving DCI #2, terminal 2 determines that the immediately previous DCI of DCI #2 is DCI #4, and then determines that DCI #2 is identical to DCI #4 by comparing the NDI in DCI #2 with the NDI in DCI #4, so as to determine that the NDI in DCI #2 indicates a retransmission. However, since the NDI in DCI #2 indicates a new transmission, an error occurs when terminal 2 determines the information indicated by the NDI in DCI #2.

Figure 3:
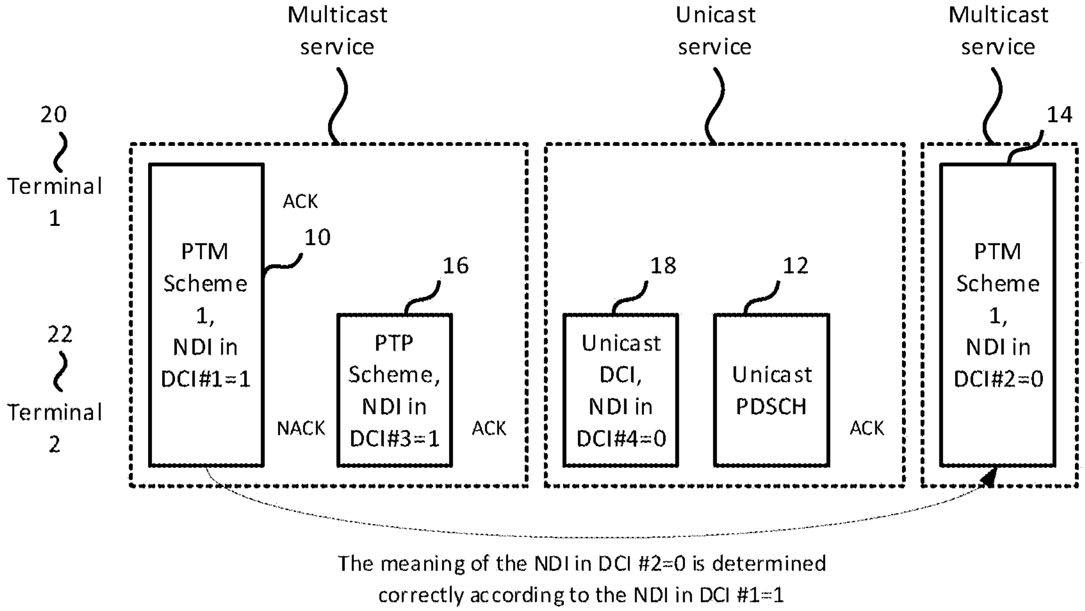
FIG. 3 illustrates a schematic diagram of determining a meaning of an NDI according to an example of the disclosure.

FIG. 3 illustrates a schematic diagram of determining a meaning of an NDI according to an example of the disclosure.

According to the example of the disclosure, after receiving the first DCI transmitted by the network side, the terminal may determine the first NDI in the first DCI, and determine the first RNTI that scrambles the first DCI.

Further, the terminal may search for a second DCI from the DCI prior to the first DCI, instead of searching for the immediately previous DCI of the first DCI, on the condition that the second RNTI that scrambles the found second DCI is identical to the first RNTI that scrambles the first DCI is assured. Here, the second RNTI is identical to the first RNTI, which may mean that the second RNTI and the first RNTI are of the same type, for example, both the second RNTI and the first RNTI are the C-RNTIs or the G-RNTIs, or alternatively may mean that the second RNTI and the first RNTI have the same value.

Finally, the information indicated by the first NDI may be determined according to the relation between the second NDI in the second DCI and the first NDI, in other words, whether the first NDI is configured to indicate a new transmission or a retransmission. Thus, the information indicated by the first NDI is determined accurately.

As shown in FIG. 3, for example, with still terminal 2 22 in FIG. 2 as an example, after receiving DCI #2 14, terminal 2 may not determine the information indicated by the NDI in DCI #2 according to the relation between the NDI in DCI #4 and the NDI in DCI #2, but instead determine the RNTI scrambling DCI #2, according to the example of the disclosure.

Since DCI #2 is transmitted during communication between the network side and the terminal in the PTM scheme 1, the RNTI scrambling DCI #2 is the G-RNTI. The DCI scrambled by the G-RNTI prior to DCI #2 is DCI #1. Thus, the terminal may determine the information indicated by the NDI in DCI #2 according to the relation between the NDI in DCI #1 and the NDI in DCI #2. The NDI in DCI #1 is 1, and the NDI in DCI #2 is 0. Thus, it is determined that DCI #1 and DCI #2 are different from each other. It is further determined that the NDI in DCI #2 is configured to indicate a new transmission. That is, it is indicated that the MBS PDSCH scheduled by the DCI is configured for the new transmission. It can be seen that, according to the example, the information indicated by the NDI in DCI #2 may be determined accurately by terminal 2.

In an example, the step that information indicated by the first NDI is determined according to a relation between a second NDI in the second DCI and the first NDI includes:

- the first NDI is determined to indicate a new transmission in response to a determination that the second NDI is different from the first NDI; and
- the first NDI is determined to indicate a retransmission in response to a determination that the second NDI is identical to the first NDI.

The case that the second NDI is different from the first NDI may also be described as that the second NDI is toggled relatively to the first NDI, for example, the second NDI is 1 while the first NDI is 0, or the second NDI is 0 while the first NDI is 1. It may be determined that the first NDI indicates a new transmission in response to a determination that the first NDI is toggled relatively to the second NDI.

A case that the second NDI is identical to the first NDI may also be described as that the second NDI is not toggled relatively to the first NDI, for example, both the second NDI and the first NDI are 1, or both the second NDI and the first NDI are 0. It may be determined that the first NDI indicates a retransmission in response to a determination that the first NDI is not toggled relatively to the second NDI.

In an example, a hybrid automatic repeat request process identifier (HARQ process ID) in the second DCI is identical to a HARQ process ID in the first DCI.

In an example, the DCI may carry the HARQ process ID. When determining the information indicated by the first NDI in the first DCI, the terminal searches for the second DCI from the DCI carrying a HARQ process ID same as the first DCI prior to the first DCI, instead of searching for the second DCI from the DCI carrying a HARQ process ID different from the first DCI. Accordingly, it may be ensured that data scheduled by the found second DCI and data scheduled by the first DCI belong to the same HARQ process. It is further ensured that the second NDI also indicates a new transmission or a retransmission of the HARQ process of the first NDI, avoiding the error resulting in determining the information indicated by the NDI across the HARQ processes.

In an example, the first DCI and the second DCI are at least one type of the DCI configured for uses as follows:

DCI configured to schedule a unicast physical downlink shared channel (unicast PDSCH);

DCI configured to schedule a new transmission of a multicast broadcast service physical downlink shared channel (MBS PDSCH); and DCI configured to schedule a retransmission of the multicast broadcast service physical downlink shared channel (MBS PDSCH).

The unicast PDSCH means a PDSCH scheduled by user equipment-specific downlink control information (UE-specific DCI) and scrambled by a UE-specific RNTI, and may be received by a particular terminal only, for example, DCI #4 transmitted by the network side to the terminal in the unicast service phase in the example shown in FIG. 3.

The MBS PDSCH means a PDSCH scheduled by group common downlink control information (group common DCI) and scrambled by a RNTI associated with a terminal of a group, and may be received by terminals belonging to the same group, for example, DCI #1 and DCI #2 are transmitted by the network side to the terminal in the multicast service phase in the example shown in FIG. 3.

In an example, the DCI configured to schedule a unicast PDSCH is scrambled by a C-RNTI;

the DCI configured to schedule a new transmission of an MBS PDSCH is scrambled by a G-RNTI; and the DCI configured to schedule a retransmission of the MBS PDSCH is scrambled by a C-RNTI.

For example, DCI #4 in the example shown in FIG. 3 is configured to schedule the unicast PDSCH and is scrambled by the C-RNTI. DCI #1 is configured to schedule a new transmission of the MBS PDSCH in the PTM scheme 1 and is scrambled by the G-RNTI. DCI #3 16 s configured to schedule a retransmission of the MBS PDSCH in the PTT scheme and is scrambled by the C-RNTI.

Figure 4:
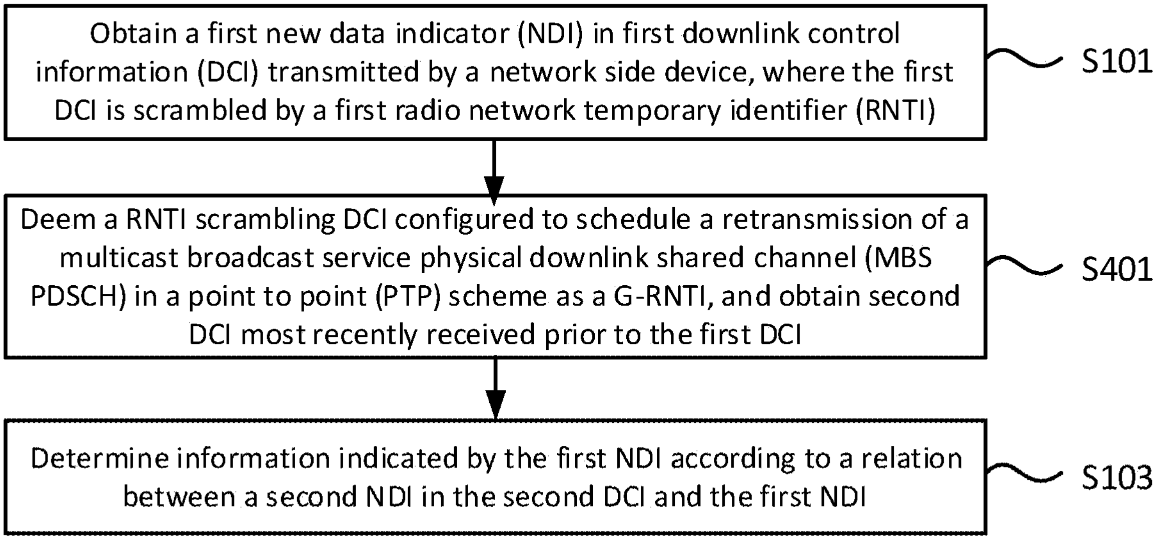
FIG. 4 illustrates a schematic flowchart of another method for determining an indication according to an example of the disclosure.

FIG. 4 illustrates a schematic flowchart of another method for determining an indication according to an example of the disclosure. As shown in FIG. 4, the step that the second DCI received most recently prior to the first DCI is obtained includes:

S401, the RNTI that scrambles the DCI configured to schedule a retransmission of the MBS PDSCH in a PTP scheme is deemed as the G-RNTI, and the second DCI received most recently prior to the first DCI is obtained.

In an example, when there is a DCI configured to schedule a retransmission of the MBS PDSCH in a PTP scheme, the DCI is scrambled by the C-RNTI. However, the DCI configured to schedule the MBS PDSCH in other schemes (for example, the PTM scheme 1) is generally scrambled by the G-RNTI.

With still the example shown in FIG. 3, in order to determine the information indicated by the NDI in DCI #2, the terminal finds DCI #1 and determines the information indicated by the NDI in DCI #2 according to the relation between the NDI in DCI #1 and the NDI in DCI #2, since both DCI #2 and DCI #1 are scrambled by the G-RNTI while DCI #2 and DCI #3 are scrambled by the C-RNTI, In this case, DCI #2 14 and DCI #4 18 are both configured to schedule the MBP PDSCH, and DCI #2 is configured to schedule the retransmission of the MBS PDSCH in the PTP scheme. Thus, the information indicated by the NDI in DCI #2 may also be determined according to the relation between the NDI in DCI #2 and the NDI in DCI #4, the only difference is that the RNTI scrambling DCI #2 is different from the RNTI scrambling DCI #4.

According to the example, the RNTI that scrambles the DCI configured to schedule a retransmission of the MBS PDSCH in a point to point (PTP) scheme may be deemed as the G-RNTI first. Then, the second DCI received most recently prior to the first DCI is obtained. For example, the C-RNTI scrambling DCI #2 in the example shown in FIG. 3 may be deemed as the G-RNTI. Since the RNTI scrambling DCI #4 is the G-RNTI, DCI #2 is determined as the second DCI by determining the DCI scrambled most recently by the G-RNTI prior to DCI #4.

It can be seen from FIG. 3 that since the distance from DCI #4 to DCI #2 is closer than that from DCI #1 to DCI #2 in the time domain, the terminal may determine the second DCI more rapidly.

Then, the information indicated by the NDI in DCI #2 is determined according to the relation between the NDI in DCI #4 and the NDI in DCI #2. Since the NDI in DCI #4 is 1, and the NDI in DCI #2 is 0, it may be determined that the NDI in DCI #2 is configured to indicate a new transmission.

In an example, the step that the RNTI that scrambles the DCI configured to schedule a retransmission of the MBS PDSCH in a point to point (PTP) scheme is deemed as the G-RNTI, and the second DCI received most recently prior to the first DCI is obtained includes:

the RNTI that scrambles the DCI configured to schedule a retransmission of the MBS PDSCH in a PTP scheme is deemed as the G-RNTI in response to a determination that the retransmission, scheduled by the DCI configured to schedule a retransmission of the MBS PDSCH in a PTP scheme, is successfully received, and the second DCI received most recently prior to the first DCI is obtained.

In an example, as the terminal may fail to receive the retransmission of the MBS PDSCH scheduled by the DCI in the PTP scheme (for example, no receipt or fail to decode after the receipt), the terminal transmits a HARQ-NACK to the network side. The network side determines that the terminal fails to receive the retransmission of the MBS PDSCH according to the HARQ-NACK transmitted by the terminal, and may retransmit the DCI configured to schedule a retransmission of the MBS PDSCH in the PTP scheme.

In this case, if the RNTI that scrambles the DCI configured to schedule a retransmission of the MBS PDSCH in a PTP scheme is deemed as the G-RNTI, it may be only taken into consideration of the DCI configured to schedule a retransmission of the MBS PDSCH in a PTP scheme that is received, rather than the DCI configured to schedule a retransmission of the MBS PDSCH in the PTP scheme that is transmitted continuously by the network side.

According to the example, the RNTI that scrambles the DCI configured to schedule a retransmission of the MBS PDSCH in a PTP scheme is deemed as the G-RNTI only in response to a determination that the retransmission, scheduled by the DCI configured to schedule a retransmission of the MBS PDSCH in a PTP scheme, is successfully received, and the second DCI received most recently prior to the first DCI is obtained.

Since the terminal may transmit a HARQ-ACK to the network side when the retransmission, scheduled by the DCI configured to schedule a retransmission of the MBS PDSCH in a PTP scheme, is successfully received, the network side may determine that the retransmission of the MBS PDSCH has been received successfully according to the HARQ-ACK transmitted by the terminal, and thus may stop transmitting the DCI configured to schedule a retransmission of the MBS PDSCH. Then, the RNTI that scrambles the DCI configured to schedule a retransmission of the MBS PDSCH in a PTP scheme is deemed as the G-RNTI by the terminal. Thus, the RNTI may be deemed as the G-RNTI for the DCI configured to schedule a retransmission of the MBS PDSCH in the PTP scheme transmitted by the network side each time, avoiding certain individual DCI not using the RNTI as G-RNTI.

Figure 5:
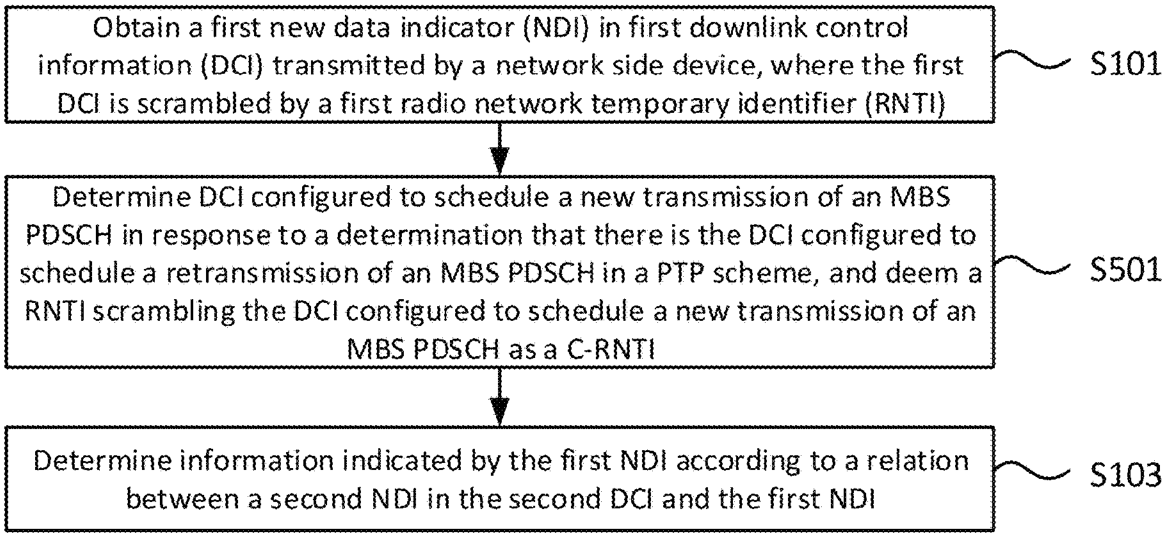

FIG. 5 illustrates a schematic flowchart of yet another method for determining an indication according to an example of the disclosure. As shown in FIG. 5, the step that the second DCI received most recently prior to the first DCI was obtained includes:

S501, the DCI configured to schedule a new transmission of an MBS PDSCH is determined in response to a determination that there is a DCI configured to schedule a retransmission of the MBS PDSCH in a PTP scheme, the RNTI that scrambles the DCI configured to schedule a new transmission of the MBS PDSCH is deemed as a C-RNTI, and the second DCI received most recently prior to the first DCI is obtained.

In an example of the disclosure, when determining the information indicated by a first NDI in the first DCI, the second DCI scrambled by the RNTI scrambling the first DCI and received most recently is searched for from the DCI prior to the first DCI, and the information indicated by the first NDI is determined according to the relation between a second NDI in the second DCI and the first NDI. In this case, there may be some problems.

For example, when there is a DCI configured to schedule a retransmission of the MBS PDSCH in a PTP scheme, the DCI is scrambled by a C-RNTI; however, the DCI configured to schedule a new transmission of the MBS PDSCH (for example, in the PTM scheme 1) is scrambled by a G-RNTI. In order to determine the information indicated by the NDI in the DCI configured to schedule a retransmission of the MBS PDSCH in a PTP scheme, since the DCI configured to schedule a new transmission of the MBS PDSCH is scrambled by the G-RNTI, it is impossible to determine the information indicated by the NDI in the DCI configured to schedule a retransmission of the MBS PDSCH in a PTP scheme according to a relation between the NDI in the DCI configured to schedule a new transmission of the MBS PDSCH and the NDI in the DCI configured to schedule a retransmission of the MBS PDSCH in a PTP scheme.

With still the example shown in FIG. 3, DCI #3 is configured to schedule a retransmission of the MBS PDSCH in the PTP scheme, and is scrambled by the C-RNTI. DCI #1 is configured to schedule a new transmission of the MBS PDSCH and is scrambled by the G-RNTI. When determining the information indicated by an NDI in DCI #3, since the RNTI scrambling DCI #3 is different from the RNTI scrambling DCI #1, it is impossible to determine the information indicated by the NDI in DCI #3 according to the relation between the NDI in DCI #1 and the NDI in DCI #3.

According to the example, when there is a DCI configured to schedule a retransmission of the MBS PDSCH in a PTP scheme, the DCI configured to schedule a new transmission of an MBS PDSCH may be determined. Then, the G-RNTI that scrambles the DCI configured to schedule a new transmission of an MBS PDSCH is deemed as the C-RNTI. Accordingly, when determining the information indicated by the NDI in the DCI configured to schedule a retransmission of the MBS PDSCH in a PTP scheme, the relation between the NDI in the DCI configured to schedule a new transmission of the MBS PDSCH and the NDI in the DCI configured to schedule a retransmission of the MBS PDSCH in a PTP scheme may be employed.

For example, on the basis of the example shown in FIG. 3, the G-RNTI of DCI #1 configured to schedule a new transmission of the MBS PDSCH may be deemed as the C-RNTI. When determining the information indicated by the NDI in DCI #3 configured to schedule a retransmission of the MBS PDSCH in a PTP scheme, since the RNTI scrambling DCI #3 is the C-RNTI, and the RNTI scrambling DCI #1 is also deemed as the C-RNTI, the RNTI scrambling DCI #3 is deemed identical to the RNTI scrambling DCI #1. Thus, when DCI #3 is deemed as the first DCI, and DCI #1 may be deemed as the second DCI, the information indicated by the NDI in DCI #3 may be determined according to the relation between the NDI in DCI #1 and the NDI in DCI #3. Since the NDI in DCI #1 is 1, and the NDI in DCI #3 is 1, it may be determined that the NDI in DCI #3 is configured to indicate a retransmission.

FIG. 6 illustrates a schematic flowchart of a method for setting information according to an example of the disclosure. The method for setting information shown in the example may be executed by the network side device (corresponding to the network side in the above example). The network side device may communicate with the terminal. The network side device includes, but is not limited to, a 4G base station, a 5G base station, a 6G base station, etc. The terminal includes, but is not limited to, a mobile phone, a tablet computer, a wearable device, a sensor, an Internet of Things device (for example, an NB-IOT device, an MTC communication apparatus, and an eMTC communication apparatus), etc.

As shown in FIG. 6, the method for setting information may include:

S601, first downlink control information (DCI) is transmitted to a terminal, where the first DCI is scrambled by a first radio network temporary identifier (RNTI);

S602, second DCI transmitted to the terminal most recently prior to the first DCI is obtained, where a second RNTI scrambling the second DCI is identical to the first RNTI; and S603, a first NDI in the first DCI is set according to a second NDI in the second DCI.

According to the example of the disclosure, the first DCI may be scrambled by the first RNTI when the network side device transmits the first DCI to the terminal. In order to set the first NDI in the first DCI, the network side device may search for the second DCI scrambled by the second RNTI identical to the first RNTI and transmitted most recently to the terminal from the DCI transmitted to the terminal prior to the first DCI, instead of searching for the immediately previous DCI of the first DCI. Then, the first NDI is set according to the second NDI in the second DCI. In other words, by setting a value of the first NDI, the first NDI may indicate a new transmission or a retransmission. Thus, it may be determined by the terminal that the information indicated by the first NDI is accurate after the first DCI is transmitted to the terminal.

As shown in FIG. 3, for example, with still terminal 2 in FIG. 2 as an example, when the network side device transmits DCI #2 to terminal 2, since DCI #2 is configured to schedule a new transmission of the MBS PDSCH, an NDI in DCI #2 needs to be set to indicate a new transmission. According to the example of the disclosure, the network side device may set the NDI in DCI #2 according to the RNTI scrambling DCI #2, instead of the immediately previous DCI of DCI #2, that is, DCI #4.

Since DCI #2 is transmitted during communication between the network side device and the terminal in the PTM scheme 1, the RNTI scrambling DCI #2 is the G-RNTI. The DCI prior to DCI #2 and scrambled by the G-RNTI is DCI #1. Accordingly, the network side device may set the NDI in DCI #2 according to the NDI in DCI #1. For example, the NDI in DCI #1 is 1, in order to configure the NDI in DCI #2 to indicate a new transmission, the NDI in DCI #2 may be set to a value different from the value of the NDI in DCI #1, i.e., 0. Accordingly, it may be ensured that the information indicated by the NDI in DCI #2 may be accurately determined after DCI #2 is transmitted to terminal 2.

In an example, the step that a first NDI in the first DCI is set according to a second NDI in the second DCI includes:

the first NDI is set to be different from the second NDI in response to a determination that the first DCI is configured to schedule a new transmission, where the first NDI is configured to indicate the new transmission; and the first NDI is set to be identical to the second NDI in response to a determination that the first DCI is configured to schedule a retransmission, where the first NDI is configured to indicate the retransmission.

The case that the second NDI is different from the first NDI may also be described as that the second NDI is toggled relatively to the first NDI. For example, when the first DCI is configured to schedule a new transmission, the first NDI may be set to 0 if the second NDI is 1. Alternatively, the first NDI may be set to 1 if the second NDI is 0. Thus, the terminal may determine that the first NDI is toggled relatively to the second NDI after the first DCI is transmitted to the terminal. Thus, it is determined that the information indicated by the first NDI is configured to indicate a new transmission.

The case that the second NDI is identical to the first NDI may also be described as that the second NDI is not toggled relatively to the first NDI. For example, when the first DCI is configured to schedule a new transmission, the first NDI may be set to 1 if the second NDI is 1. Alternatively, the first NDI may be set to 0 if the second NDI is 0. Thus, the terminal may determine that the first NDI is not toggled relatively to the second NDI after the first DCI is transmitted to the terminal. Thus, it is determined that the information indicated by the first NDI is configured to indicate a retransmission.

In an example, a hybrid automatic repeat request process identifier (HARQ process ID) in the second DCI is identical to a HARQ process ID in the first DCI.

In an example, the DCI may carry the HARQ process ID. When setting the first NDI in the first DCI, the network side device searches for the second DCI from the DCI carrying a HARQ process ID same as the first DCI prior to the first DCI, instead of searching for the second DCI from the DCI carrying a HARQ process ID different from the first DCI. Accordingly, it may be ensured that data scheduled by the found second DCI and data scheduled by the first DCI belong to the same HARQ process. It is further ensured that the second NDI also indicates a new transmission or a retransmission of the HARQ process of the first NDI, avoiding the error resulted in determining the information indicated by the NDI across the HARQ processes.

In an example, the first DCI and the second DCI are at least one type of the DCI configured for uses as follows:

DCI configured to schedule a unicast physical downlink shared channel (unicast PDSCH);

DCI configured to schedule a new transmission of a multicast broadcast service physical downlink shared channel (MBS PDSCH); and DCI configured to schedule a retransmission of the multicast broadcast service physical downlink shared channel (MBS PDSCH).

The unicast PDSCH means a PDSCH scheduled by user equipment-specific downlink control information (UE-specific DCI) and scrambled by a UE-specific RNTI, and may be received by a particular terminal only, for example, DCI #4 transmitted by the network side to the terminal in the unicast service phase in the example shown in FIG. 3.

The MBS PDSCH means a PDSCH scheduled by group common downlink control information (group common DCI) and scrambled by a RNTI associated with a terminal of a group, and may be received by terminals belonging to the same group, for example, DCI #1 and DCI #2 are transmitted by the network side to the terminal in the multicast service phase in the example shown in FIG. 3.

In an example, the DCI configured to schedule a unicast PDSCH is scrambled by a C-RNTI;

the DCI configured to schedule a new transmission of an MBS PDSCH is scrambled by a G-RNTI; and the DCI configured to schedule a retransmission of the MBS PDSCH is scrambled by a C-RNTI.

For example, DCI #4 in the example shown in FIG. 3 is configured to schedule the unicast PDSCH and scrambled by the C-RNTI. DCI #1 is configured to schedule a new transmission of the MBS PDSCH in the PTM scheme 1 and scrambled by the G-RNTI. DCI #3 is configured to schedule a retransmission of the MBS PDSCH in the PTT scheme and scrambled by the C-RNTI.

FIG. 7 illustrates a schematic flowchart of another method for setting information according to an example of the disclosure. As shown in FIG. 7, the step that second DCI transmitted to the terminal most recently prior to the first DCI is obtained includes:

S701, the RNTI that scrambles the DCI configured to schedule a retransmission of an MBS PDSCH in a point to point (PTP) scheme is deemed as a G-RNTI, and the second DCI transmitted to the terminal most recently prior to the first DCI is obtained.

In an example, when there is DCI configured to schedule a retransmission of the MBS PDSCH in a PTP scheme, the DCI is scrambled by the C-RNTI. However, the DCI configured to schedule the MBS PDSCH in other schemes (for example, the PTM scheme 1) is generally scrambled by the G-RNTI.

With the example shown in FIG. 3, in order to set information indicated by an NDI in DCI #2, the network side device finds DCI #1 and sets the NDI in DCI #2 according to the NDI in DCI #1, since both DCI #2 and DCI #1 are scrambled by the G-RNTI while DCI #2 and DCI #3 are scrambled by the C-RNTI.

In this case, DCI #2 and DCI #4 are both configured to schedule the MBP PDSCH, and DCI #2 is configured to schedule the retransmission of the MBS PDSCH in the PTP scheme. Thus, the NDI in DCI #2 can also be set according to the value of an NDI in DCI #4; the only difference is that the RNTI scrambling in DCI #2 is different from the RNTI scrambling in DCI #4.

According to the example, the RNTI that scrambles the DCI configured to schedule a retransmission of the MBS PDSCH in a point to point (PTP) scheme may be deemed as the G-RNTI first. Then, the second DCI transmitted to the terminal most recently prior to the first DCI is obtained. For example, the C-RNTI scrambling DCI #2 in the example shown in FIG. 3 may be deemed as the G-RNTI. Since the RNTI scrambling DCI #4 is the G-RNTI, DCI #2 is determined as the second DCI by determining the DCI most recently scrambled by the G-RNTI prior to DCI #4.

It can be seen from FIG. 3 that since the distance from DCI #4 to DCI #2 is closer than that from DCI #1 to DCI #2 in the time domain, the terminal may determine the second DCI more rapidly.

Then, the NDI in DCI #2 is set according to the NDI in DCI #4. Since the NDI in DCI #4 is 1, and DCI #2 is configured to schedule a new transmission, the NDI in DCI #2 may be set as toggled relative to the NDI in DCI #4. In other words, the NDI in DCI #2 is set to 0. Then, it may be determined by the terminal that the NDI in DCI #2 is configured to indicate a new transmission after DCI #2 is transmitted to the terminal.

In an example, the steps that the RNTI that scrambles the DCI configured to schedule a retransmission of an MBS PDSCH in a point to point (PTP) scheme is deemed as a G-RNTI, and the second DCI transmitted to the terminal most recently prior to the first DCI is obtained include: the RNTI that scrambles the DCI configured to schedule a retransmission of an MBS PDSCH in a PTP scheme is deemed as the G-RNTI in response to a determination that the retransmission, scheduled by the DCI configured to schedule a retransmission of an MBS PDSCH in a PTP scheme, is successfully received by the terminal, and the second DCI transmitted to the terminal most recently prior to the first DCI is obtained.

In an example, as the terminal may fail to receive the retransmission of the MBS PDSCH scheduled by the DCI in the PTP scheme (for example, no receipt or fail to decode after the receipt), the terminal transmits a HARQ-NACK to the network side. The network side determines that the terminal fails to receive the retransmission of the MBS PDSCH according to the HARQ-NACK transmitted by the terminal, and may retransmit the DCI configured to schedule a retransmission of the MBS PDSCH in the PTP scheme.

In this case, if the RNTI that scrambles the DCI configured to schedule a retransmission of an MBS PDSCH in a PTP scheme is deemed as the G-RNTI, it may be only taken into consideration of the DCI configured to schedule a retransmission of the MBS PDSCH in a PTP scheme that is transmitted, rather than the DCI configured to schedule a retransmission of the MBS PDSCH in the PTP scheme to be transmitted.

According to the example, the RNTI that scrambles the DCI configured to schedule a retransmission of an MBS PDSCH in a PTP scheme is deemed as the G-RNTI only in response to a determination that the retransmission, scheduled by the DCI configured to schedule a retransmission of an MBS PDSCH in a PTP scheme, of the MBS PDSCH is successfully received, and the second DCI transmitted to the terminal most recently prior to the first DCI is obtained.

Since the terminal may transmit a HARQ-ACK to the network side when the retransmission, scheduled by the DCI configured to schedule a retransmission of the MBS PDSCH in a PTP scheme, is successfully received, the network side may determine that the retransmission of the MBS PDSCH has been received successfully according to the HARQ-ACK transmitted by the terminal, and thus may stop transmitting the DCI configured to schedule a retransmission of the MBS PDSCH. Then, the RNTI that scrambles the DCI configured to schedule a retransmission of an MBS PDSCH in a PTP scheme is deemed as the G-RNTI by the network side. Thus, the RNTI may be deemed as the G-RNTI for the DCI configured to schedule a retransmission of the MBS PDSCH in the PTP scheme transmitted by the network side each time, avoiding certain individual DCI not using the RNTI as G-RNTI.

FIG. 8 illustrates a schematic flowchart of yet another method for setting information according to an example of the disclosure. As shown in FIG. 8, the step of obtaining the second DCI transmitted to the terminal most recently prior to the first DCI includes:

S801, DCI configured to schedule a new transmission of an MBS PDSCH is determined in response to a determination that DCI configured to schedule a retransmission of the MBS PDSCH in a PTP scheme exists, the RNTI that scrambles the DCI configured to schedule a new transmission of an MBS PDSCH is deemed as a C-RNTI, and the second DCI transmitted to the terminal most recently prior to the first DCI is obtained.

In an example of the disclosure, when determining information indicated by a first NDI in the first DCI, the second DCI scrambled by the RNTI that scrambles the first DCI and transmitted to the terminal most recently is searched for from the DCI prior to the first DCI, and the first NDI in the first DCI is set according to a second NDI in the second DCI. In this case, there may be some problems.

For example, when there is a DCI configured to schedule a retransmission of the MBS PDSCH in a PTP scheme, the DCI is scrambled by a C-RNTI; however, the DCI configured to schedule a new transmission of an MBS PDSCH (for example, in the PTM scheme 1) is scrambled by a G-RNTI. In order to set the information indicated by the NDI in the DCI configured to schedule a retransmission of the MBS PDSCH in a PTP scheme, since the DCI configured to schedule a new transmission of the MBS PDSCH is scrambled by the G-RNTI, it is impossible to set the NDI in the DCI configured to schedule a retransmission of the MBS PDSCH in a PTP scheme according to the NDI in the DCI configured to schedule a new transmission of an MBS PDSCH.

With still the example shown in FIG. 3 as an example, DCI #3 is configured to schedule a retransmission of the MBS PDSCH in the PTP scheme, and is scrambled by the C-RNTI. DCI #1 is configured to schedule a new transmission of an MBS PDSCH and is scrambled by the G-RNTI. When setting an NDI in DCI #3, since the RNTI scrambling of DCI #3 is different from the RNTI scrambling of DCI #1, it is impossible to set the NDI in DCI #3 according to the NDI in DCI #1.

According to the example, when there is DCI configured to schedule a retransmission of the MBS PDSCH in a PTP scheme, the DCI configured to schedule a new transmission of an MBS PDSCH may be determined. Then, the G-RNTI that scrambles the DCI configured to schedule a new transmission of an MBS PDSCH is deemed as the C-RNTI. Accordingly, when setting the NDI in the DCI configured to schedule a retransmission of the MBS PDSCH in a PTP scheme, the DCI configured to schedule a new transmission of an MBS PDSCH may be employed.

For example, on the basis of the example shown in FIG. 3, the G-RNTI of DCI #1 configured to schedule a new transmission of the MBS PDSCH may be deemed as the C-RNTI. When setting the NDI in DCI #3 configured to schedule a retransmission of the MBS PDSCH in a PTP scheme, since the RNTI scrambling DCI #3 is the C-RNTI, and the RNTI scrambling DCI #1 is also deemed as the C-RNTI, the RNTI scrambling DCI #3 is deemed identical to the RNTI scrambling DCI #1. Thus, when DCI #3 is deemed as the first DCI, and DCI #1 may be deemed as the second DCI. Then, the NDI in DCI #3 may be set according to the NDI in DCI #1. Since the NDI in DCI #1 is 1, and DCI #3 is configured to schedule a retransmission, the NDI in DCI #3 may be set as not toggled relatively to the NDI in DCI #1. In other words, the NDI in DCI #3 is set to 1. Then, it may be determined by the terminal that the NDI in DCI #3 is configured to indicate retransmission after transmitting DCI #3 to the terminal.

The solutions of the disclosure are illustratively described below through several examples.

FIG. 9 illustrates a schematic diagram of determining a meaning of an NDI according to an example of the disclosure.

As shown in FIG. 9, a communication scheme supported by UE1 24 and UE2 25 includes, but is not limited to, a PTM scheme 1 and a PTP scheme. UE1 and UE2 may also support a unicast service scheduled by unicast DCI. Moreover, UE1 and UE2 belong to the same group, and thus may receive the same multicast DCI configured to schedule a multicast service.

First, a communication process between the network side and UE1 is described as follows: The network side transmits unicast DCI #11 31 configured to schedule a new transmission of the unicast PDSCH to UE1, where the value of an NDI in DCI #11 is 1, and DCI #11 is scrambled by the C-RNTI. UE1 transmits a HARQ-ACK to the network side after a successful receipt.

Next, the network side transmits unicast DCI #12 32 configured to schedule a new transmission of the unicast PDSCH to UE1, where the value of an NDI in DCI #12 is 0, and DCI #12 is scrambled by the C-RNTI. UE1 transmits a HARQ-NACK to the network side after a receipt failure.

Next, the network side transmits unicast DCI #13 33 configured to schedule a retransmission of the unicast PDSCH to UE1, where the value of an NDI in DCI #13 is 0, and DCI #13 is scrambled by the C-RNTI. UE1 transmits a HARQ-ACK to the network side after a successful receipt.

Next, the network side transmits multicast DCI #14 34 configured to schedule a new transmission of the MBS PDSCH to UE1 (UE2 may also receive multicast DCI #14) in the PTM scheme 1, where the value of an NDI in DCI #14 is 0, and DCI #14 is scrambled by the G-RNTI. UE1 transmits a HARQ-ACK to the network side after a successful receipt.

Next, the network side transmits multicast DCI #15 35 configured to schedule a new transmission of the MBS PDSCH to UE1 (UE2 may also receive multicast DCI #15) in the PTM scheme 1, where the value of an NDI in DCI #15 is 1, and DCI #15 is scrambled by the G-RNTI. UE1 transmits a HARQ-ACK to the network side after a successful receipt.

Next, the network side transmits unicast DCI #16 36 configured to schedule a retransmission of the unicast PDSCH to UE1, where the value of an NDI in DCI #16 is 1, and DCI #16 is scrambled by the C-RNTI. UE1 transmits a HARQ-ACK to the network side after a successful receipt.

In such a process, when UE1 determines information indicated by the NDI in unicast DCI #16, the NDI in DCI #15 which is immediately prior to DCI #16 is not employed, but DCI #13 may be found by searching for the DCI most recently scrambled by the C-RNTI from the DCI prior to DCI #16. Then, the information indicated by the NDI in DCI #16 is determined according to the relation between the NDI in DCI #13 and the NDI in DCI #16. Since the value of the NDI in DCI #16 is 1, and the value of the NDI in DCI #13 is 0, the NDI in DCI #16 is toggled relatively to the NDI in DCI #13, the NDI in DCI #16 is configured to indicate a new transmission. In other words, DCI #16 is configured to schedule a new transmission of the MBS PDSCH.

Next, a communication process between the network side and UE2 is described as follows: The network side transmits unicast DCI #17 37 configured to schedule a new transmission of a unicast PDSCH to UE2, where the value an NDI in DCI #17 is 0, and DCI #17 is scrambled by the C-RNTI. UE2 transmits a HARQ-ACK to the network side after a successful receipt.

Next, the network side transmits unicast DCI #18 38 configured to schedule a new transmission of the unicast PDSCH to UE2 where a value of an NDI in DCI #18 is 1, and DCI #18 is scrambled by the C-RNTI. UE2 transmits a HARQ-ACK to the network side after a successful receipt.

Next, the network side transmits multicast DCI #14 configured to schedule a new transmission of the MBS PDSCH to UE2 (UE1 may also receive multicast DCI #14) in the PTM scheme 1, where the value of an NDI in DCI #14 is 0, and DCI #14 is scrambled by the G-RNTI. UE2 transmits a HARQ-ACK to the network side after a successful receipt.

Next, the network side transmits multicast DCI #15 configured to schedule a new transmission of the MBS PDSCH to UE2 (UE1 may also receive multicast DCI #15) in the PTM scheme 1, where a value of an NDI in DCI #15 is 1, and DCI #15 is scrambled by the G-RNTI. UE2 transmits a HARQ-ACK to the network side after a successful receipt.

Next, the network side transmits unicast DCI #19 39 configured to schedule a retransmission of the unicast PDSCH to UE2, where the value of an NDI in DCI #19 is 0, and DCI #19 is scrambled by the C-RNTI. UE2 transmits a HARQ-ACK to the network side after a successful receipt.

In such a process, when UE2 determines information indicated by the NDI in unicast DCI #19, the NDI in DCI #15 which is immediately prior to DCI #19 is not employed, but DCI #18 may be found by searching for the DCI most recently scrambled by the C-RNTI from the DCI prior to DCI #19. Then, the information indicated by the NDI in DCI #19 is determined according to the relation between the NDI in DCI #18 and the NDI in DCI #19. Since the value of the NDI in DCI #19 is 0, and the value of the NDI in DCI #18 is 1, the NDI in DCI #19 is toggled relatively to the NDI in DCI #18, the NDI in DCI #19 is configured to indicate a new transmission. In other words, DCI #19 is configured to schedule a new transmission of the MBS PDSCH.

FIG. 10 illustrates another schematic diagram of determining a meaning of an NDI according to an example of the disclosure.

As shown in FIG. 10, a communication scheme supported by UE1 and UE2 includes, but is not limited to, a PTM scheme 1 and a PTP scheme. UE1 24 and UE2 25 may also support a unicast service scheduled by unicast DCI. Moreover, UE1 and UE2 belong to the same group, and thus may receive the same multicast DCI configured to schedule a multicast service.

First, a communication process between the network side and UE1 is described as follows: The network side transmits unicast DCI #21 41 configured to schedule a new transmission of an MBS PDSCH to UE1 in the PTM scheme 1, where the value of an NDI in DCI #21 is 1, and DCI #21 is scrambled by the G-RNTI. UE1 transmits a HARQ-NACK to the network side after a receipt failure.

Next, the network side transmits unicast DCI #22 42 configured to schedule a new transmission of the unicast PDSCH to UE1, where the value of an NDI in DCI #22 is 0, and DCI #22 is scrambled by the C-RNTI. UE1 transmits a HARQ-NACK to the network side after a receipt failure.

Next, the network side transmits unicast DCI #23 43 configured to schedule a retransmission of the unicast PDSCH to UE1, where the value of an NDI in DCI #23 is 0, and DCI #23 is scrambled by the C-RNTI. UE1 transmits a HARQ-ACK to the network side after a successful receipt.

Next, the network side performs a multicast service and transmits DCI #24 configured to schedule a retransmission of the MBS PDSCH to the terminal in the PTP scheme, where the value of an NDI in DCI #24 44 is 1, and DCI #24 is scrambled by the C-RNTI.

In such a process, when UE1 determines information indicated by the NDI in unicast DCI #24, the NDI in DCI #23 which is immediately prior to DCI #24 is not employed, but the C-RNTI scrambling DCI #24 is deemed as the G-RNTI first. Then, DCI #21 may be found by searching for the DCI most recently scrambled by the G-RNTI from the DCI prior to DCI #24. Finally, the information indicated by the NDI in DCI #24 is determined according to the relation between the NDI in DCI #21 and the NDI in DCI #24. Since the value of the NDI in DCI #24 is 1, and the value of the NDI in DCI #21 is 1 as well, the NDI in DCI #24 is not toggled relatively to the NDI in DCI #21, the NDI in DCI #24 is configured to indicate a retransmission. In other words, DCI #24 is configured to schedule a retransmission of the MBS PDSCH.

During communication between the network side and UE2, UE2 may also deem the C-RNTI scrambling DCI #24 as the G-RNTI first. Then, DCI #21 may be found by searching for the DCI most recently scrambled by the G-RNTI from the DCI prior to DCI #24. Finally, information indicated by the NDI in DCI #24 is determined according to the relation between the NDI in DCI #21 and the NDI in DCI #24. Since the value of the NDI in DCI #24 is 1, and the value of the NDI in DCI #21 is 1, the NDI in DCI #24 is not toggled relatively to the NDI in DCI #21, the NDI in DCI #24 is configured to indicate a retransmission. In other words, DCI #24 is configured to schedule a retransmission of the MBS PDSCH.

Corresponding to the example of the aforementioned method for determining an indication and the example of the aforementioned method for setting information, an example of an apparatus for determining an indication and an example of an apparatus for setting information are further provided by the disclosure.

FIG. 11 illustrates a schematic block diagram of an apparatus for determining an indication according to an example of the disclosure. The apparatus for determining an indication shown in the example may be applicable to a terminal. The terminal includes, but is not limited to, a mobile phone, a tablet computer, a wearable device, a sensor, an Internet of Things device (for example, a narrow band Internet of Things (NB-IoT) device), a machine type communication (MTC) apparatus, an enhanced machine type communication (eMTC) apparatus, etc. The terminal may communicate with the network side device. The network side device includes, but is not limited to, a 4G network side device, a 5G network side device, a 6G network side device, etc., and may be, for example, a base station and a core network.

As shown in FIG. 11, the apparatus for determining an indication may include:

a processing module 1101 configured to obtain a first new data indicator (NDI) in first downlink control information (DCI) transmitted by the network side device, where the first DCI is scrambled by a first radio network temporary identifier (RNTI);

obtain second DCI received most recently prior to the first DCI, where a second RNTI scrambling the second DCI is identical to the first RNTI; and determine information indicated by the first NDI according to a relation between a second NDI in the second DCI and the first NDI.

In an example, a hybrid automatic repeat request process identifier (HARQ process ID) in the second DCI is identical to a HARQ process ID in the first DCI.

In an example, the processing module is configured to determine that the first NDI is configured to indicate a new transmission in response to a determination that the second NDI is different from the first NDI; and determine that the first NDI is configured to indicate a retransmission in response to a determination that the second NDI is identical to the first NDI.

In an example, the first DCI and the second DCI are at least one type of the DCI configured for use as follows:

DCI configured to schedule a unicast physical downlink shared channel (unicast PDSCH);

DCI configured to schedule a new transmission of a multicast broadcast service physical downlink shared channel (MBS PDSCH); and DCI configured to schedule a retransmission of the multicast broadcast service physical downlink shared channel (MBS PDSCH).

In an example, the DCI configured to schedule a unicast PDSCH is scrambled by a C-RNTI;

the DCI configured to schedule a new transmission of an MBS PDSCH is scrambled by a G-RNTI; and the DCI configured to schedule a retransmission of the MBS PDSCH is scrambled by a C-RNTI.

In an example, the processing module is configured to deem the RNTI that scrambles the DCI configured to schedule a retransmission of the MBS PDSCH in a point to point (PTP) scheme as the G-RNTI, and obtain the second DCI received most recently prior to the first DCI.

In an example, the processing module is configured to deem the RNTI that scrambles the DCI configured to schedule a retransmission of the MBS PDSCH in a PTP scheme as the G-RNTI in response to a determination that the retransmission, scheduled by the DCI configured to schedule a retransmission of the MBS PDSCH in a PTP scheme, is successfully received, and obtain the second DCI received most recently prior to the first DCI.

In an example, the processing module is configured to determine the DCI configured to schedule a new transmission of an MBS PDSCH in response to a determination that there is a DCI configured to schedule a retransmission of the MBS PDSCH in a PTP scheme, and deem the G-RNTI that scrambles the DCI configured to schedule a new transmission of an MBS PDSCH as the C-RNTI.

FIG. 12 illustrates a schematic block diagram of an apparatus for setting information according to an example of the disclosure. The apparatus for setting information shown in the example may be applicable to the network side device (corresponding to the network side in the above example).

The network side device may communicate with the terminal. The network side device includes, but is not limited to, a 4G base station, a 5G base station, a 6G base station, etc. The terminal includes, but is not limited to, a mobile phone, a tablet computer, a wearable device, a sensor, an Internet of Things device (for example, an NB-IoT device, an MTC communication apparatus, and an eMTC communication apparatus), etc.

As shown in FIG. 12, the apparatus for setting information may include:

- a transmission module 1201 configured to transmit first downlink control information (DCI) to the terminal, where the first DCI is scrambled by a first radio network temporary identifier (RNTI); and
- a processing module 1202 configured to obtain second DCI transmitted to the terminal most recently prior to the first DCI, where a second RNTI scrambling the second DCI is identical to the first RNTI; and
- set a first NDI in the first DCI according to a second NDI in the second DCI.

In an example, a hybrid automatic repeat request process identifier (HARQ process ID) in the second DCI is identical to a HARQ process ID in the first DCI.

In an example, the processing module is configured to set the first NDI to be different from the second NDI in response to a determination that the first DCI is configured to schedule a new transmission, where the first NDI is configured to indicate the new transmission; and set the first NDI to be identical to the second NDI in response to a determination that the first DCI is configured to schedule a retransmission, where the first NDI is configured to indicate the retransmission.

In an example, the first DCI and the second DCI are at least one type of the DCI configured for use as follows:

- DCI configured to schedule a unicast physical downlink shared channel (unicast PDSCH);
- DCI configured to schedule a new transmission of a multicast broadcast service physical downlink shared channel (MBS PDSCH); and
- DCI configured to schedule a retransmission of the multicast broadcast service physical downlink shared channel (MBS PDSCH).

In an example, the DCI configured to schedule a unicast PDSCH is scrambled by a C-RNTI;

- the DCI configured to schedule a new transmission of an MBS PDSCH is scrambled by a G-RNTI; and
- the DCI configured to schedule a retransmission of the MBS PDSCH is scrambled by a C-RNTI.

In an example, the processing module is configured to deem the RNTI scrambling DCI configured to schedule a retransmission of the MBS PDSCH in a point to point (PTP) scheme as the G-RNTI, and obtain the second DCI transmitted to the terminal most recently prior to the first DCI.

In an example, the processing module is configured to deem the RNTI that scrambles the DCI configured to schedule a retransmission of the MBS PDSCH in a PTP scheme as the G-RNTI in response to a determination that the terminal receives the retransmission, scheduled by the DCI configured to schedule a retransmission of the MBS PDSCH in a PTP scheme successfully, and obtain the second DCI transmitted to the terminal most recently prior to the first DCI.

In an example, the processing module is configured to determine the DCI configured to schedule a new transmission of an MBS PDSCH in response to a determination that there is DCI configured to schedule a retransmission of the MBS PDSCH in a PTP scheme, and deem the RNTI that scrambles the DCI configured to schedule a new transmission of an MBS PDSCH as the C-RNTI.

The specific manner in which each module of the apparatus in the above example to execute an operation has been described in detail in the example of the relevant method and will not be elaborated here.

Since the apparatus example basically corresponds to the method example, the relevant parts can be referred to the partial description in the method example. The apparatus example described above is merely illustrative. The modules described as separate components may be physically separated or not. The components shown as modules may be physical modules or not. In other words, the components may be positioned in one place or distributed over a plurality of network modules. The solution in the example may be implemented by selecting some or all the modules needed in practice. Those of ordinary skills in the art can understand and implement the disclosure without creative efforts.

A communication apparatus is further provided in the example of the disclosure. The communication apparatus includes: a processor; and a memory configured to store a computer program; where the computer program implements the method for determining an indication in any example described above when executed by the processor.

A communication apparatus is further provided in the example of the disclosure. The communication apparatus includes: a processor; and a memory configured to store a computer program; where the computer program implements the method for setting information in any example described above when executed by the processor.

A computer-readable storage medium is further provided in the example of the disclosure. The computer-readable storage medium is configured to store a computer program, where the computer program implements steps of the method for determining an indication in any example described above when executed by a processor.

A computer-readable storage medium is further provided in the example of the disclosure. The computer-readable storage medium is configured to store a computer program, where the computer program implements steps of the method for setting information in any example described above when executed by a processor.

As shown in FIG. 13, a schematic block diagram of an apparatus 1300 for setting information according to an example of the disclosure is provided. The apparatus 1300 may be provided as a base station. With reference to FIG. 13, the apparatus 1300 includes a processing component 1322, a radio transmission/reception component 1324, an antenna component 1326, and a signal processing component specific to a radio interface. The processing component 1322 may further include one or more processors. One processor of the processing component 1322 may be configured to implement the method for setting information in any example described above.

FIG. 14 illustrates a schematic block diagram of an apparatus 1400 for determining an indication according to an example of the disclosure. For example, the apparatus 1400 may be a mobile phone, a computer, a digital broadcast terminal, a messaging device, a gaming console, a tablet device, a medical device, a fitness device, a personal digital assistant, etc.

With reference to FIG. 14, the apparatus 1400 may include one or more components as follows: a processing component 1402, a memory 1404, a power component 1406, a multimedia component 1408, an audio component 1410, an input/output (I/O) interface 1412, a sensor component 1414, and a communication component 1416.

Generally, the processing component 1402 controls an overall operation of the apparatus 1400, such as operations associated with the display, telephone calls, data communication, a camera operation, and a recording operation. The processing component 1402 may include one or more processors 1420 to execute instructions, so as to complete all or some steps of the above method for determining an indication. In addition, the processing component 1402 may include one or more modules, so as to facilitate interactions between the processing component 1402 and other components. For example, the processing component 1402 may include a multimedia module, so as to facilitate the interaction between the multimedia component 1408 and the processing component 1402.

The memory 1404 is configured to support the operations on the apparatus 1400 by storing various types of data. Instances of these data include instructions configured for any application or method operating on the apparatus 1400, contact data, phone directory data, message, picture, video, etc. The memory 1404 may be implemented by any type of volatile or non-volatile storage devices or their combinations, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power component 1406 provides power for various components of the apparatus 1400. The power component 1406 may include a power management system, one or more power sources, and other components associated with power generation, management, and distribution for the apparatus 1400.

The multimedia component 1408 includes a screen that provides an output interface between the apparatus 1400 and a user. In some examples, the screen may include a liquid crystal display (LCD) and a touch panel (TP). If including a touch panel, the screen may be implemented as a touch screen, so as to receive an input signal from the user. The touch panel includes one or more touch sensors, so as to sense touches, swipes, and gestures on the touch panel. The touch sensor may sense a boundary of a touch or swipe action and measure duration and pressure associated with a touch or swipe operation. In some examples, the multimedia component 1408 includes a front-facing camera and/or a rear-facing camera. When the apparatus 1400 is in an operation mode, such as a photographing mode or a video mode, the front-facing camera and/or the rear-facing camera may receive external multimedia data. Each of the front-facing camera and the rear-facing camera may be a fixed optical lens system or have a focal length and an optical zooming capability.

The audio component 1410 is configured to output and/or input audio signals. For example, the audio component 1410 includes a microphone (MIC) configured to receive external audio signals when the apparatus 1400 is in the operation mode, for example, a calling mode, a recording mode, or a speech recognition mode. The audio signals received may be further stored in the memory 1404 or transmitted via the communication component 1416. In some examples, the audio component 1410 further includes a speaker configured to output an audio signal.

The I/O interface 1412 provides an interface between the processing component 1402 and a peripheral interface module. The above peripheral interface module may be a keyboard, a click wheel, a button, etc. These buttons may include, but are not limited to, a home button, a volume button, a start button, and a lock button.

The sensor component 1414 includes one or more sensors configured to provide state assessments for various aspects of the apparatus 1400. For example, the sensor component 1414 may detect an on/off state of the apparatus 1400, and relative location of the components. For example, the components are the display and the keypad of the apparatus 1400. The sensor component 1414 may also detect a change in position of the apparatus 1400 or one component of the apparatus 1400, the presence or absence of contact between the user and the apparatus 1400, an orientation or acceleration/deceleration of the apparatus 1400, and a change in temperature of the apparatus 1400. The sensor component 1414 may include a proximity sensor configured to detect the presence of nearby objects in the absence of any physical contact. The sensor component 1414 may further include a light sensor, such as a complementary metal-oxide-semiconductor transistor (CMOS) or charge coupled device (CCD) image sensor configured to be used in imaging application. In some examples, the sensor component 1414 may further include an acceleration sensor, a gyroscope sensor, a magnetic sensor, a pressure sensor, or a temperature sensor.

The communication component 1416 is configured to facilitate wired or radio communication between the apparatus 1400 and other devices. The apparatus 1400 may access a radio network on the basis of a communication standard, such as a wireless fidelity (WiFi) network, a 2nd generation (2G) network, a 3rd generation (3G) network, a 4G long term evolution (LTE) network, a 5G new radio (NR) network, or their combinations. In an illustrative example, the communication component 1416 receives a broadcast signal or broadcast related information from an external broadcast management system via a broadcast channel. In an illustrative example, the communication component 1416 further includes a near field communication (NFC) module, so as to facilitate short-range communication. For example, the NFC module may be implemented on the basis of a radio frequency identification (RFID) technology, an infrared data association (IrDA) technology, an ultra-wide band (UWB) technology, a Bluetooth (BT) technology, etc.

In an illustrative example, the apparatus 1400 may be configured to execute the above method for determining an indication by being implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, etc.

A non-transitory computer-readable storage medium including an instruction, for example, a memory 1404 including an instruction is further provided in an illustrative example. The above instruction may complete the above method for determining an indication by being executed by a processor 1420 of an apparatus 1400. For example, the non-transitory computer-readable storage medium may be an ROM, a random-access memory (RAM), a compact disk read-only memory (CD-ROM), a magnetic tape, a floppy disk, an optical data storage device, etc.

Those skilled in the art will readily conceive of other embodiments of the disclosure after considering the description and practice of the disclosure disclosed here. The disclosure is intended to cover any variations, uses, or adaptive changes of the disclosure, which follow the general principles of the disclosure and include common general knowledge or conventional technical means in the art not disclosed in the disclosure. The description and the examples are merely deemed illustrative, and the true scope and spirit of the disclosure are indicated by the following claims.

It should be understood that the disclosure is not limited to precise structures that have been described above and shown in the accompanying drawings, and various modifications and changes can be made without departing from the scope of the disclosure. The scope of the disclosure is limited merely by the appended claims.

It should be noted that the relational terms here, such as first and second, are merely used to distinguish one entity or operation from another entity or operation without necessarily requiring or implying any such actual relation or order between these entities or operations. The terms "comprise", "include", "encompass", or any other variations thereof are intended to cover non-exclusive inclusions. Thus, a process, method, article, or device including a series of elements further includes other elements that are not explicitly listed except for those elements, or further includes elements inherent to such a process, method, article, or device. Without more restrictions, the elements defined by the sentence "comprise a . . . " and "include a . . . " do not exclude the existence of other identical elements in the process, method, article, or device including the elements.

The methods and apparatuses according to the examples of the disclosure are described in detail above. The principles and embodiments of the disclosure are set forth by applying specific instances here, and the description of the above examples is merely used to assist in understanding the methods of the disclosure and their core concepts. Moreover, those of ordinary skill in the art will make amendments to the particular embodiments and the application scope according to the concept of the disclosure. In conclusion, the contents of the description should not be interpreted as limiting the disclosure.

The invention claimed is:

1. A method for determining an indication, executed by a terminal and comprising:
  - obtaining a first new data indicator (NDI) in first downlink control information (DCI) transmitted by a network side device, wherein the first DCI is scrambled by a first radio network temporary identifier (RNTI);
  - obtaining a second DCI received most recently prior to the first DCI, wherein a second RNTI scrambling the second DCI is identical to the first RNTI, wherein the first DCI is DCI configured to schedule a new transmission of a multicast broadcast service physical downlink shared channel (MBS PDSCH), the DCI configured to schedule the new transmission of the MBS PDSCH is scrambled by a group radio network temporary identifier (G-RNTI), and DCI configured to schedule a retransmission of the MBS PDSCH is scrambled by a cell radio network temporary identifier (C-RNTI),
    - wherein obtaining the second DCI received most recently prior to the first DCI comprises:
    - deeming the C-RNTI scrambling the DCI configured to schedule the retransmission of the MBS PDSCH in a point to point (PTP) scheme as the G-RNTI, and obtaining the second DCI received most recently prior to the first DCI; and
    - determining information indicated by the first NDI according to a relation between a second NDI in the second DCI and the first NDI.

2. The method according to claim 1, wherein a hybrid automatic repeat request process identifier (HARQ process ID) in the second DCI is identical to a HARQ process ID in the first DCI.

3. The method according to claim 1, wherein the determining information indicated by the first NDI according to the relation between the second NDI in the second DCI and the first NDI comprises:
  - determining that the first NDI is configured to indicate a new transmission in response to a determination that the second NDI is different from the first NDI; and
  - determining that the first NDI is configured to indicate a retransmission in response to a determination that the second NDI is identical to the first NDI.

4. The method according to claim 3, wherein the second NDI being different from the first NDI comprises that the second NDI is toggled relatively to the first NDI, and the second NDI being identical to the first NDI comprises that the second NDI is not toggled relatively to the first NDI.

5. The method according to claim 1, wherein deeming the C-RNTI scrambling the DCI configured to schedule the retransmission of the MBS PDSCH in the PTP scheme as the G-RNTI, and obtaining the second DCI received most recently prior to the first DCI comprise:
  - deeming the C-RNTI that scrambles the DCI configured to schedule the retransmission of the MBS PDSCH in the PTP scheme as the G-RNTI in response to a determination that the retransmission scheduled by the DCI configured to schedule the retransmission of the MBS PDSCH in the PTP scheme is successfully received, and obtaining the second DCI received most recently prior to the first DCI.

6. The method according to claim 5, further comprising:
  - indicating, by the terminal, the network side device to stop sending the DCI configured to schedule the retransmission of the MBS PDSCH in the PTP scheme by sending a hybrid automatic repeat request acknowledgement (HARQ-ACK) to the network side device.

7. A method for setting information, executed by a network side device and comprising:
  - transmitting first downlink control information (DCI) to a terminal, wherein the first DCI is scrambled by a first radio network temporary identifier (RNTI);
  - obtaining second DCI transmitted to the terminal most recently prior to the first DCI, wherein a second RNTI scrambling the second DCI is identical to the first RNTI, wherein the first DCI is DCI configured to schedule a new transmission of a multicast broadcast service physical downlink shared channel (MBS PDSCH), the DCI configured to schedule the new transmission of the MBS PDSCH is scrambled by a group radio network temporary identifier (G-RNTI), and DCI configured to schedule a retransmission of the MBS PDSCH is scrambled by a cell radio network temporary identifier (C-RNTI),
    - wherein obtaining the second DCI transmitted to the terminal most recently prior to the first DCI comprises:
    - deeming the C-RNTI scrambling the DCI configured to schedule the retransmission of the MBS PDSCH in a point to point (PTP) scheme as the G-RNTI, and obtaining the second DCI transmitted to the terminal most recently prior to the first DCI; and
    - setting a first new data indicator (NDI) in the first DCI according to a second NDI in the second DCI.

8. The method according to claim 7, wherein a hybrid automatic repeat request process identifier (HARQ process ID) in the second DCI is identical to a HARQ process ID in the first DCI.

9. The method according to claim 7, wherein setting the first NDI in the first DCI according to the second NDI in the second DCI comprises:

setting the first NDI to be different from the second NDI in response to a determination that the first DCI is configured to schedule a new transmission, wherein the first NDI is configured to indicate the new transmission; and setting the first NDI to be identical to the second NDI in response to a determination that the first DCI is configured to schedule a retransmission, wherein the first NDI is configured to indicate the retransmission.

10. The method according to claim 9, wherein the first NDI being different from the second NDI comprises that the second NDI is toggled relatively to the first NDI, and the first NDI being identical to the second NDI comprises that the second NDI is not toggled relatively to the first NDI.

11. The method according to claim 7, wherein deeming the RNTI scrambling the DCI configured to schedule the retransmission of the MBS PDSCH in the PTP scheme as the G-RNTI, and obtaining the second DCI transmitted to the terminal most recently prior to the first DCI comprise:

deeming the C-RNTI that scrambles the DCI configured to schedule the retransmission of the MBS PDSCH in the PTP scheme as the G-RNTI in response to a determination that the retransmission scheduled by the DCI configured to schedule the retransmission of the MBS PDSCH in the PTP scheme is successfully received by the terminal, and obtaining the second DCI transmitted to the terminal most recently prior to the first DCI.

12. The method according to claim 11, further comprising:

stopping sending the DCI configured to schedule the retransmission of the MBS PDSCH in the PTP scheme after receiving a hybrid automatic repeat request acknowledgement (HARQ-ACK) from the terminal.

13. A communication apparatus, comprising:

a processor; and a memory configured to store a computer program; wherein the computer program implements a method for determining an indication when executed by the processor, the method comprising:

obtaining a first new data indicator (NDI) in first downlink control information (DCI) transmitted by a network side device, wherein the first DCI is scrambled by a first radio network temporary identifier (RNTI);

obtaining second DCI received most recently prior to the first DCI, wherein a second RNTI scrambling the second DCI is identical to the first RNTI, wherein the first DCI is DCI configured to schedule a new transmission of a multicast broadcast service physical downlink shared channel (MBS PDSCH), the DCI configured to schedule the new transmission of the MBS PDSCH is scrambled by a group radio network temporary identifier (G-RNTI), and DCI configured to schedule a retransmission of the MBS PDSCH is scrambled by a cell radio network temporary identifier (C-RNTI), wherein obtaining the second DCI received most recently prior to the first DCI comprises:

deeming the C-RNTI scrambling the DCI configured to schedule the retransmission of the MBS PDSCH in a point to point (PTP) scheme as the G-RNTI, and obtaining the second DCI received most recently prior to the first DCI; and determining information indicated by the first NDI according to a relation between a second NDI in the second DCI and the first NDI.

14. The communication apparatus according to claim 13, wherein a hybrid automatic repeat request process identifier (HARQ process ID) in the second DCI is identical to a HARQ process ID in the first DCI.

15. The communication apparatus according to claim 13, wherein the determining information indicated by the first NDI according to the relation between the second NDI in the second DCI and the first NDI comprises:

determining that the first NDI is configured to indicate a new transmission in response to a determination that the second NDI is different from the first NDI; and determining that the first NDI is configured to indicate a retransmission in response to a determination that the second NDI is identical to the first NDI.

16. The communication apparatus according to claim 15, wherein the second NDI being different from the first NDI comprises that the second NDI is toggled relatively to the first NDI, and the second NDI being identical to the first NDI comprises that the second NDI is not toggled relatively to the first NDI.

17. The communication apparatus according to claim 13, wherein deeming the C-RNTI scrambling the DCI configured to schedule the retransmission of the MBS PDSCH in the PTP scheme as the G-RNTI, and obtaining the second DCI received most recently prior to the first DCI comprise:

deeming the C-RNTI that scrambles the DCI configured to schedule the retransmission of the MBS PDSCH in the PTP scheme as the G-RNTI in response to a determination that the retransmission scheduled by the DCI configured to schedule the retransmission of the MBS PDSCH in the PTP scheme is successfully received, and obtaining the second DCI received most recently prior to the first DCI.

18. A communication apparatus, comprising:

a processor; and a memory configured to store a computer program; wherein the computer program implements the method for setting information according to claim 7 when executed by the processor.

19. A non-transitory computer-readable storage medium, configured to store a computer program, wherein the computer program implements steps of the method for determining an indication according to claim 1 when executed by a processor.

20. A non-transitory computer-readable storage medium, configured to store a computer program, wherein the computer program implements steps of the method for setting information according to claim 7 when executed by a processor.

* * * * *